United States Patent
Chen (10) Patent No.: US 7,627,140 B2
(45) Date of Patent: Dec. 1, 2009

(54) FLATTED HEXAGON SEARCH METHOD FOR FAST BLOCK MOTION ESTIMATION

(75) Inventor: Chao-Ho Chen, Tai-Nan (TW)

(73) Assignee: Huper Laboratories Co., Ltd., Jong-Shan District, Taipei (TW)

( * ) Notice: Subject to any disclaimer, the term of this patent is extended or adjusted under 35 U.S.C. 154(b) by 694 days.

(21) Appl. No.: 11/163,514

(22) Filed: Oct. 21, 2005

(65) Prior Publication Data

US 2006/0104482 A1    May 18, 2006

(30) Foreign Application Priority Data

Nov. 16, 2004    (TW) ............................... 93135059 A (51) Int. Cl.
*G06K 9/00*    (2006.01)
(52) U.S. Cl. ..................................... 382/107
(58) Field of Classification Search ................. 382/107, 382/232–238; 375/240.2–240.4, 240.12–240.24; 348/154, 155, 348.1–440.1
See application file for complete search history.

(56) References Cited

U.S. PATENT DOCUMENTS

| 6,842,483 | B1 * | 1/2005 | Au et al. ................. | 375/240.16 |
| 6,968,008 | B1 * | 11/2005 | Ribas-Corbera et al. ..................... | 375/240.16 |
| 2002/0025001 | A1 * | 2/2002 | Ismaeil et al. .......... | 375/240.16 |
| 2004/0190613 | A1 * | 9/2004 | Zhu et al. .............. | 375/240.12 |

* cited by examiner

*Primary Examiner*—Samir A. Ahmed
*Assistant Examiner*—Atiba O Fitzpatrick
(74) *Attorney, Agent, or Firm*—Winston Hsu (57) ABSTRACT

A flatted hexagon search method selects seven initial check points over three adjacent rows with six of the initial check points positioned at vertices of a hexagon and one of the initial check points positioned at a center of the hexagon. Then the seven initial check points are searched to find a minimum BDM (block distortion measure) point. With the flatted hexagon, the method will optimize speed and matching probability. Therefore the method is an attractive algorithm to estimate motion vectors for real world video data.

5 Claims, 9 Drawing Sheets

FLATTED HEXAGON SEARCH METHOD FOR FAST BLOCK MOTION ESTIMATION

BACKGROUND OF THE INVENTION

1. Field of the Invention

The present invention relates to a flatted hexagon search method, and more specifically, to a flatted hexagon search method for fast block motion estimation.

2. Description of the Prior Art

Many video encoding standards with motion compensation, such as ITU-T H.261, H.263, H.264, ISO MPEG-1, MPEG-2 and MPEG-4, are capable of effectively reducing temporary redundancy between successive frames. However the prior art shows that it takes a large amount of calculations to evaluate all candidate blocks for motion estimation inside the widow to be searched by using full search (FS) algorithm, consuming even up to 80% of the computational power for an MPEG-4 encoder. To reduce the intensive computational complexity with a tolerable distortion, fast block-matching algorithms (BMA) that can improve the computation are developed.

Figure 1:
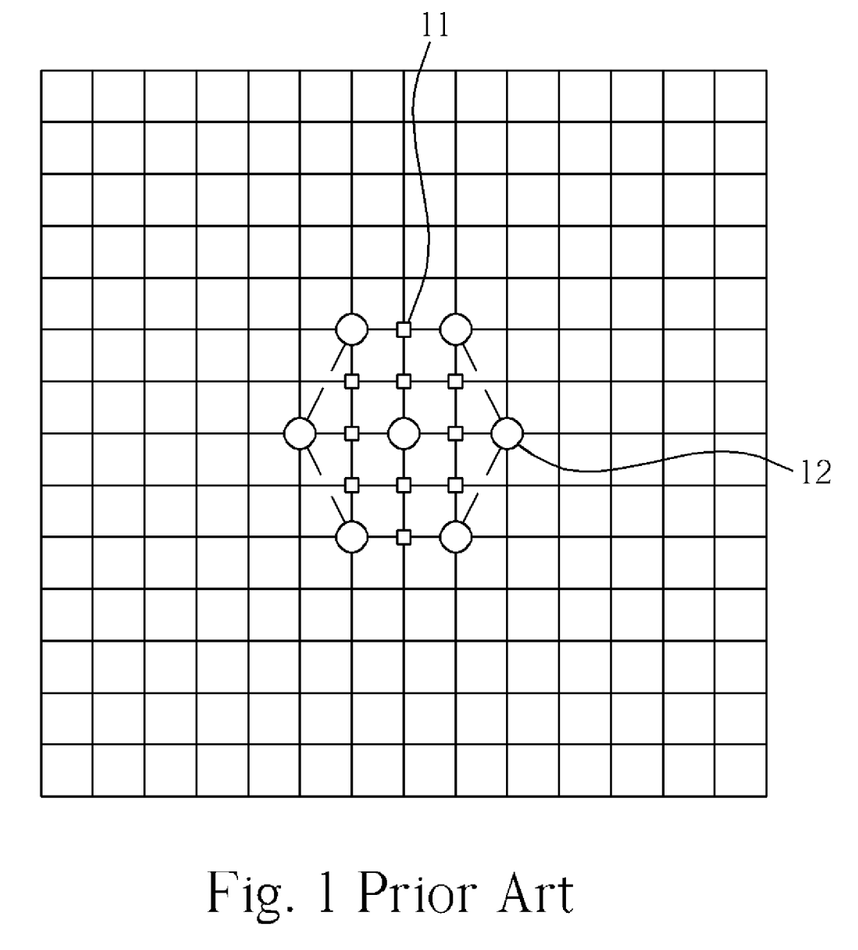
FIG. 1 is a schematic diagram of a prior art HEXBS algorithm with 10 cavity points in the searching pattern.
Figure 2:
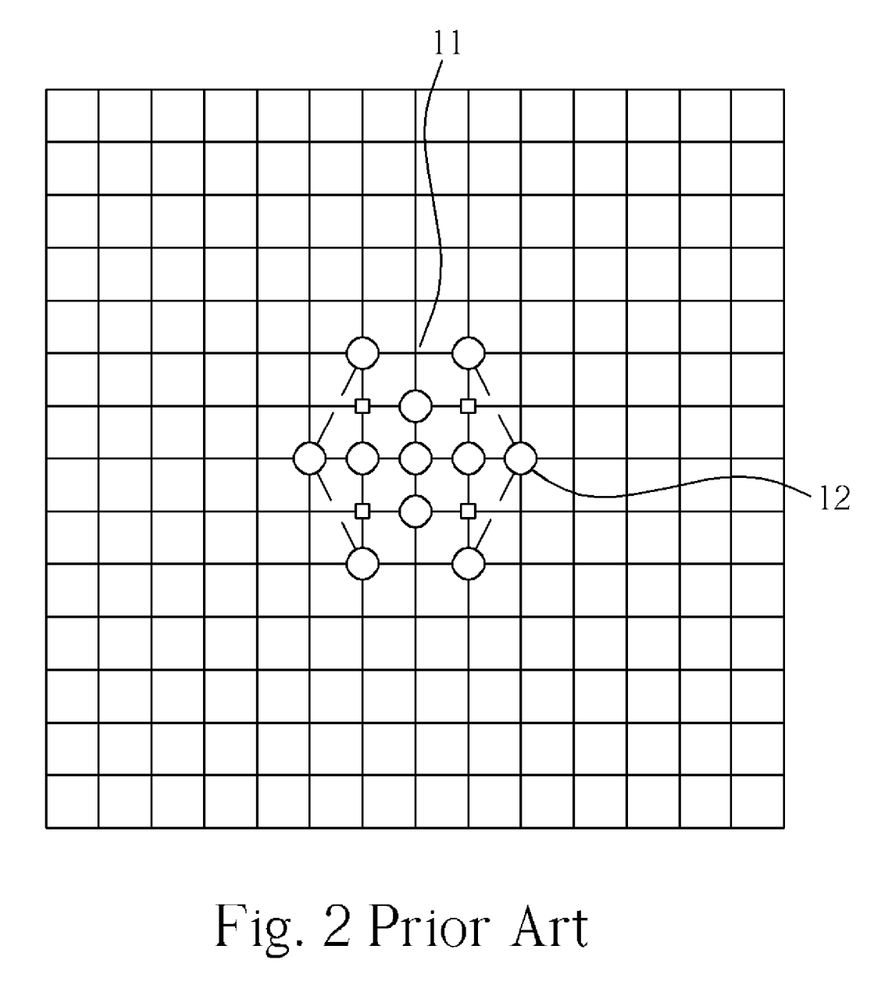
FIG. 2 is a schematic diagram of a prior art HEXBS algorithm with 4 cavity points in the final searching stage.
Figure 3:
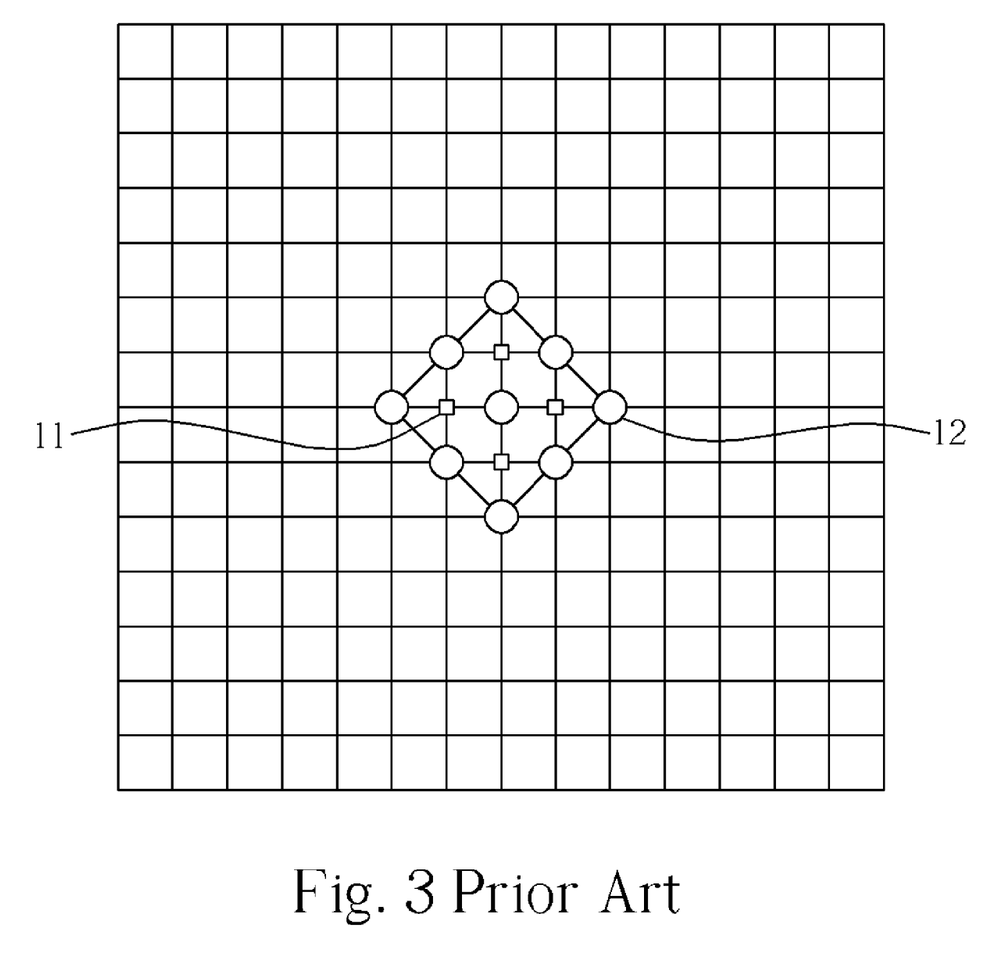
FIG. 3 is a schematic diagram of a prior art DS algorithm with 4 cavity points in the searching pattern.
Figure 4:
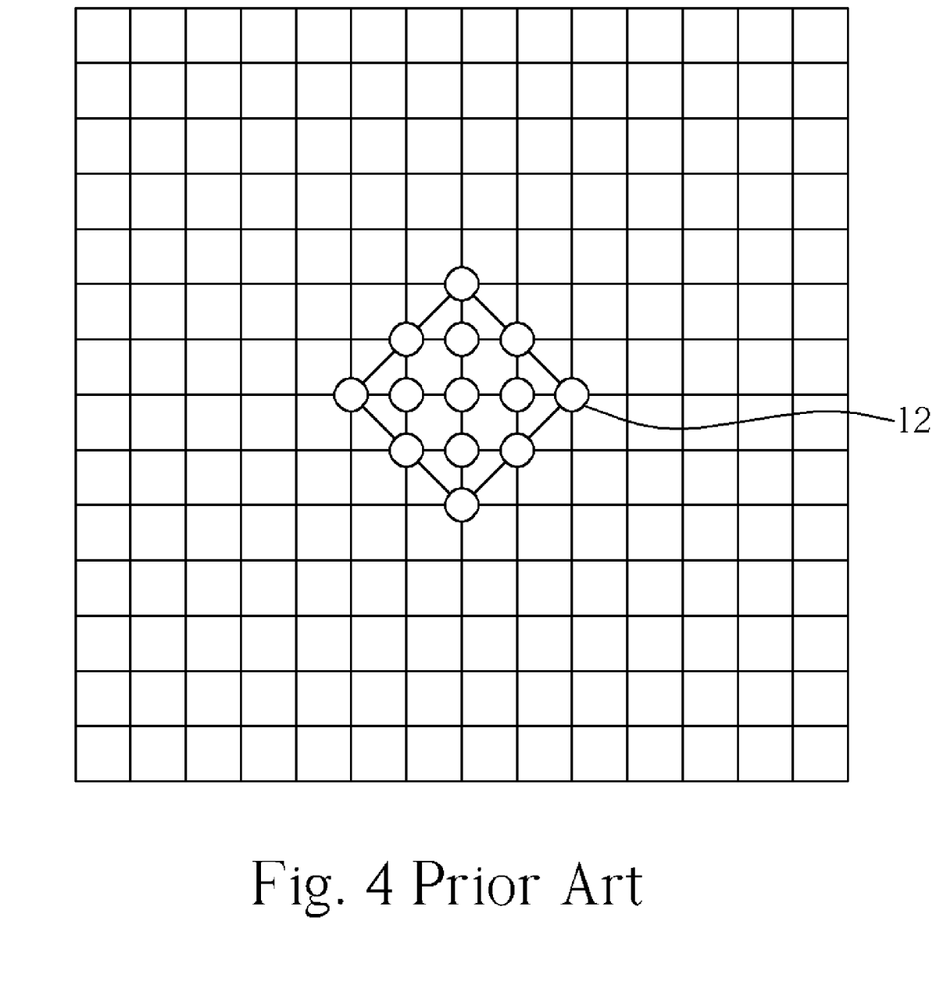
FIG. 4 is a schematic diagram of a prior art DS algorithm with 0 cavity point in the final searching stage.

To perform a search, a well-arranged searching pattern is closely relevant to the matching rate and the searching rate in any of the BMAS. Furthermore, the matching rate of a searching pattern may also be related to the degree of existed cavity, which is defined as q/p, where q represents the number of points not to be checked and p represents the number of all points included in a frame. A prior art hexagon-based search (HEXBS) utilizes fewer check points to achieve substantial speed improvement over another searching pattern named diamond-based search (DS) algorithm with similar distortion. Though the HEXBS needs fewer times for searching, its larger and fast-moving pattern also means a high degree of cavity, which leads to reduction of matching-probability performance. As FIG. 1 shows, the prior art HEXBS defines a cavity point 11 with a small block, and there are ten cavity points 11 in the searching pattern in FIG. 1. And in the final stage of HEXBS, four cavity points 11 exist as shown in FIG. 2. The prior art diamond-based search (DS) algorithm mentioned above has four and zero cavity points 11 in searching pattern in FIG. 3 and in the final stage of the search in FIG. 4 respectively. In most situations a DS has better matching-probability performance than a HEXBS.

On the other hand, fewer check points result to a faster searching speed in view of the number of check points of a searching pattern. Therefore, HEXBS is faster than DS since DS takes nine check points 12 while HEXBS takes only seven to perform every search. Here we find that in the prior art BMAS, there is no searching pattern that has fewer cavity points and fewer check points in one searching pattern, thus fastness and accuracy of the prior art BMAS can not exist at the same time. To go further, the prior art searching patterns are without exception symmetric, but based on an advanced analysis on the distributions of motion vector probabilities in the most real-world image sequences, it is clear that the probability of horizontal-biased motions is significantly larger than that of vertical-biased motions. For this reason, a horizontal-stretched searching pattern can reasonably be expected to find the optimized motion vector in a faster and more accurate manner. And an even better searching speed and searching accuracy will be achieved if the searching pattern has both even fewer cavity points (i.e. lower cavity rate) and check points.

SUMMARY OF THE INVENTION

Therefore, the primary objective of the present invention is to provide a flatted hexagon search algorithm to estimate the motion vector in a faster and more accurate way.

The present invention provides a flatted hexagon search method for fast block motion estimation. The method comprises selecting seven initial check points over three adjacent rows with six of the initial check points positioned at vertices of a hexagon and one of the initial check points positioned at a center of the hexagon, and searching the initial check points for a minimum block distortion measure (BDM) point of the seven initial check points.

These and other objectives of the present invention will no doubt become obvious to those of ordinary skill in the art after reading the following detailed description of the preferred embodiment that is illustrated in the various figures and drawings.

DETAILED DESCRIPTION

Figure 5:
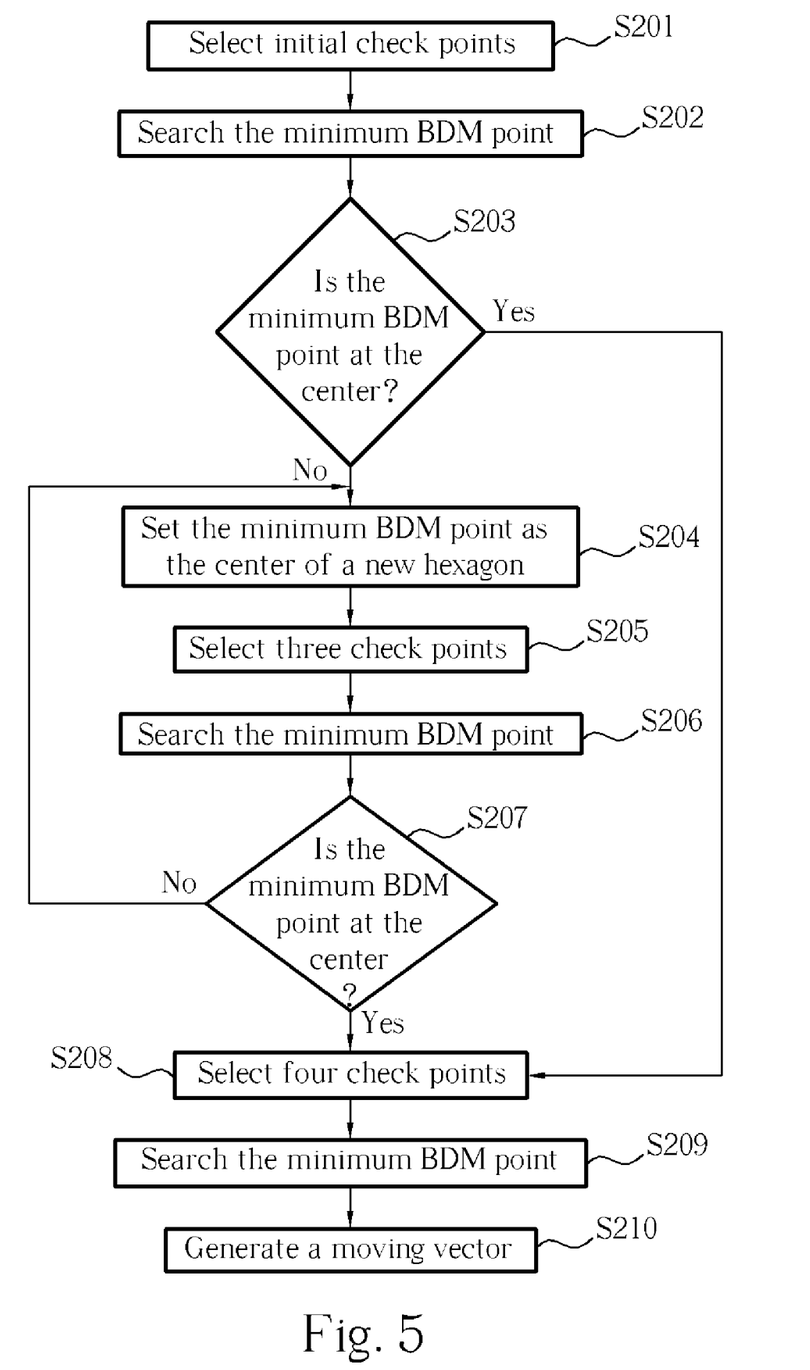
FIG. 5 illustrates a flow chart for performing a flatted hexagon search method according to the present invention.
Figure 6:
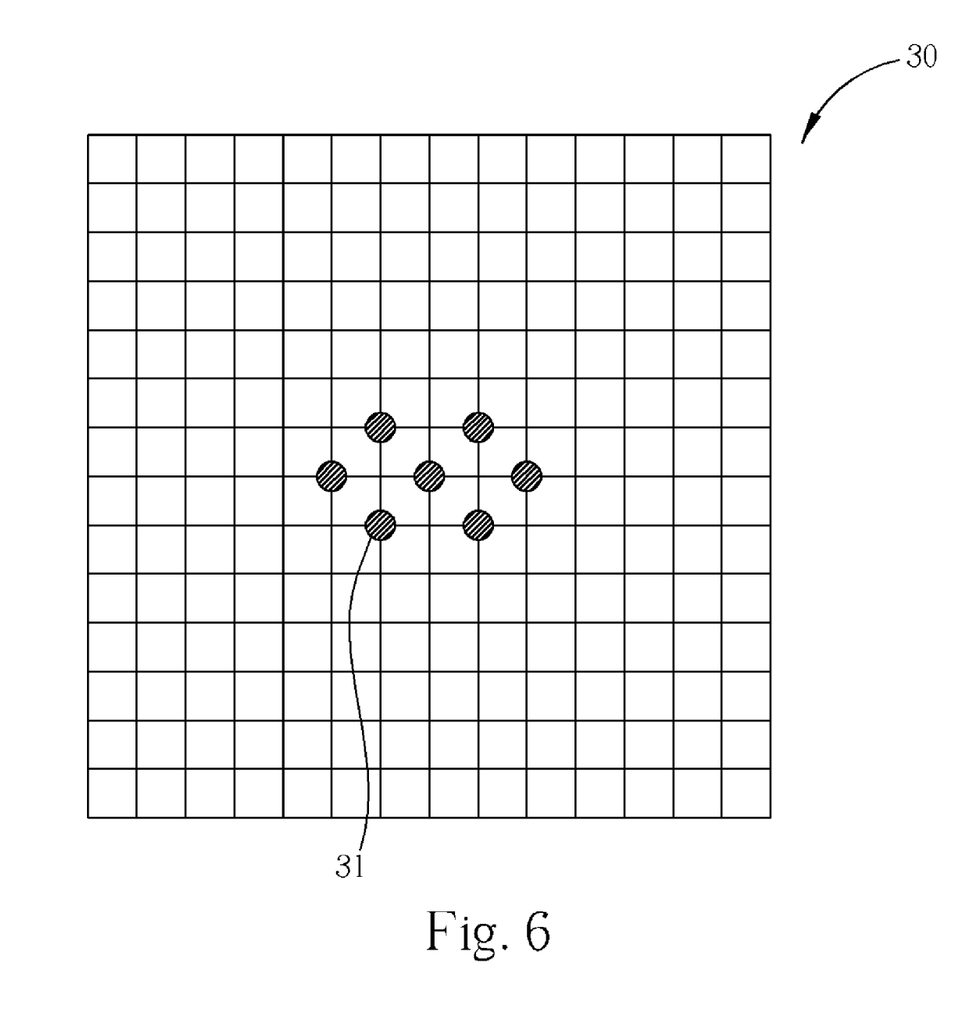
FIG. 6 to FIG. 9 are operational diagrams for performing the flatted hexagon search method in FIG. 5.

Please refer to FIGS. 5-9. FIG. 5 is a flow chart for performing a flatted hexagon search (FHS) method according to the present invention. FIG. 6 to FIG. 9 are operational diagrams for performing the flatted hexagon search method in FIG. 5. First of all, as FIG. 6 shows, seven initial check points 31 are selected in the central part of a searching window 30 at the first stage of the search. The seven initial check points 31 are selected over three adjacent rows with six of the initial check points positioned at vertices of a hexagon and one of the initial check points positioned at a center of the hexagon. The initial check points 31 are then checked for a minimum block distortion measure (BDM) point of the seven initial check points 31.

Figure 7:
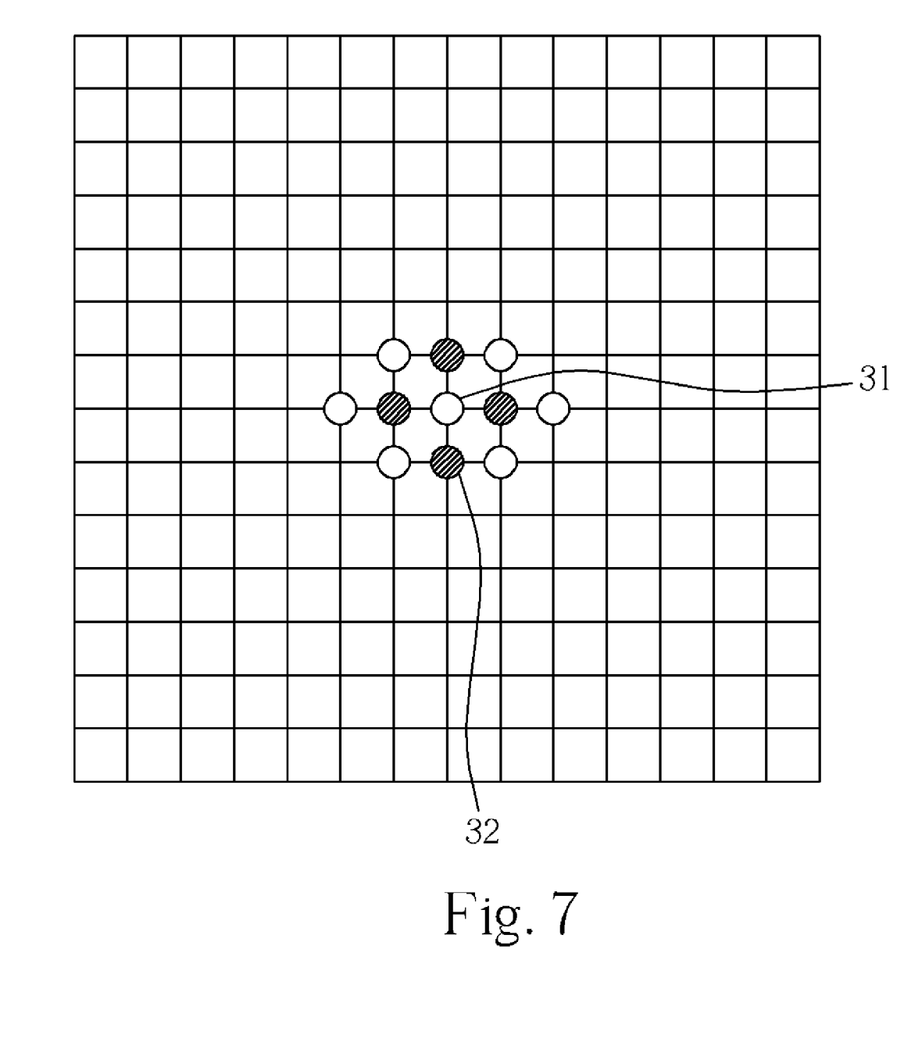

Please refer to FIG. 7. If the previous check finds that the initial check point 31 at the center of the hexagon is the minimum BDM point of the seven initial check points 31 in FIG. 6, then select four check points 32 adjacent to the initial check point 31 positioned at the center of the hexagon to form a final cross pattern, and search the four check points 32 and the initial check point 31 positioned at the center of the hexagon for a minimum BDM point of the four check points 32 and the initial check point 31 positioned at the center of the hexagon. After the minimum BDM point of the five check points is found, it is then considered as an optimized searching end point. Then a moving vector is generated according to positions of the optimized searching end point and the initial check point 31 positioned at the center of the hexagon in FIG. 7.

Figure 8:
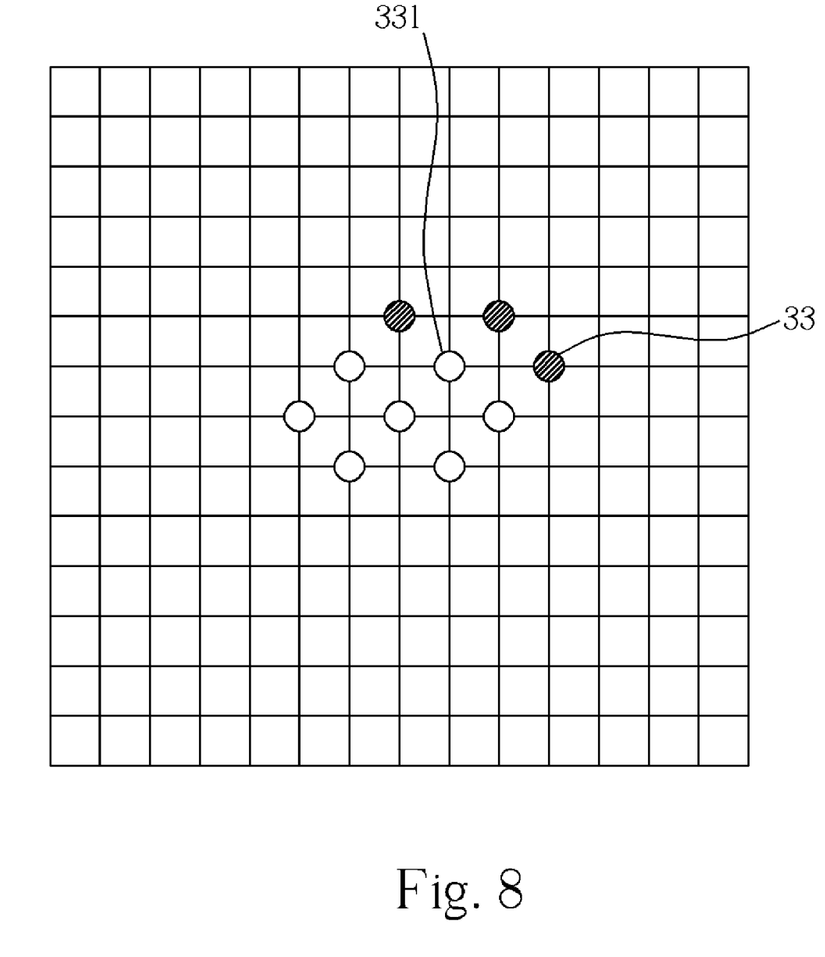

Please refer to FIG. 8. If the minimum BDM point found in FIG. 6 isn't located at the center of the original hexagon, then take the minimum BDM point found in FIG. 6 as a new center point 331 and select three check points 33 (shown as hashed circles) positioned symmetrical to three initial check points closest to the new center point 331 positioned at a vertex of the hexagon with respect to the new center point 331 positioned at the vertex of the hexagon. Then search the check points 33 selected in FIG. 8 and the initial check point 331 at the vertex of the hexagon for a minimum BDM point of the check points 33 and the initial check point 331 at the vertex of the hexagon. If the minimum BDM point is found at the center (i.e. the check point 331) of the new searching pattern, then select four check points adjacent to the check point 331 positioned at the center of the new hexagon to form a final cross pattern as in FIG. 7 and perform the same step as that in FIG. 7 described in the previous paragraph.

Figure 9:
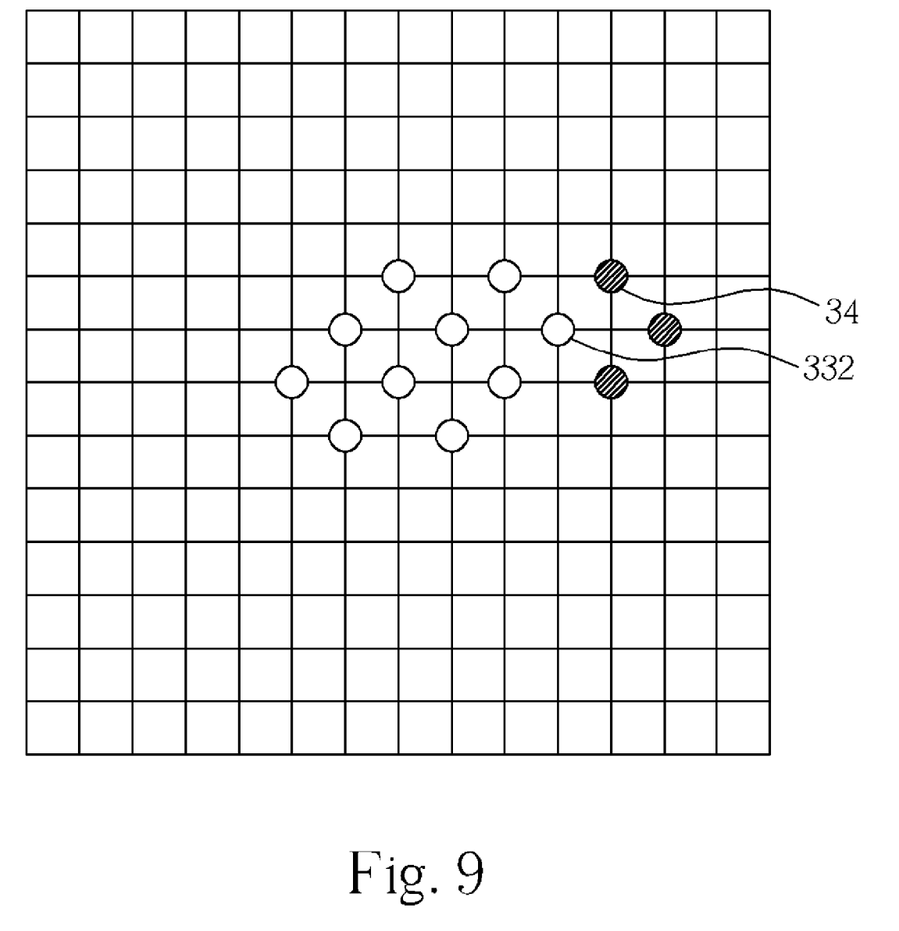

Please refer to FIG. 9. Again, if the minimum BDM point is found not at the center of the new searching pattern in FIG. 8, then take the minimum BDM point found in FIG. 8 as a center point 332 and select three check points 34 positioned symmetrical to three check points closest to the check point 332 positioned at a vertex of the hexagon with respect to the check point 332 positioned at the vertex of the hexagon. Then perform the search as previously disclosed until the found minimum BDM point is at the center of a search pattern.

Please revisit FIG. 8, instead of just searching the initial check point 331 and the three check points 33 shown as hashed circles, three additional initial check points symmetrical to the three check points 33 with respect to the initial check point 331 can be rechecked to search for the minimum BDM point of the new searching pattern. However, the minimum BDM point of the new searching pattern will not be one of the three additional initial check points symmetrical to the three check points 33 with respect to the initial check point 331 because the initial check point 331 was found to be the minimum BDM point of the seven initial check points 31 in FIG. 6. Therefore, further searching the three additional initial check points symmetrical to the three check points 33 with respect to the initial check point 331 will not change the outcome of the flatted hexagon search method of the present invention.

Please get back to FIG. 5, the searching steps of the present invention flatted hexagon searching method are listed below:

Step S201: Select seven initial check points where six of the initial check points are positioned at vertices of a flatted hexagon and one of the initial check points positioned at a center of the hexagon;

Step S202: Search the initial check points for a minimum block distortion measure (BDM) point of the seven initial check points;

Step S203: Check if the minimum BDM point is at the center of the hexagon; if so, go to Step S208;

Step S204: Set the minimum BDM point as the center of a new hexagon;

Step S205: Select three new check points positioned symmetrical to three check points closest to the minimum BDM point set in Step S204;

Step S206: Search the three check points selected in Step S205 and the check point at the center of the new hexagon for a minimum block distortion measure (BDM) point of the four check points;

Step S207: Check if the minimum BDM point in Step S206 is at the center of the new hexagon; if not, go to Step S204;

Step S208: Select four check points adjacent to the minimum BDM point positioned at the center of the hexagon;

Step S209: Search the check points for a minimum BDM point of the four check points in Step S208 and the check point at the center of the four check points; and Step S210: Generate a moving vector according to positions of the minimum block distortion measure point found in step S209 and the initial check point positioned at the center of the hexagon.

The flatted hexagon search (FHS) method performs the search with rearrangement of the searching pattern to a more flatted style, which makes the searching pattern cover more horizontal scope than vertical scope and thereby both speed and matching probability performance are improved because of its less cavity rate and fewer check points needed. Compared to the prior art HEXBS and DS, the flatted shape of the search pattern makes the present invention FHS algorithm have a searching speed only slightly smaller than that of HEXBS but significantly larger than the DS, and a matching probability larger than that of HEXBS but slightly smaller than the DS. When both searching speed and matching probability are considered, the present invention provides a more attractive algorithm for most real-world video data.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flatted hexagon search method for fast block motion estimation of video data, the video data comprising a plurality of images, each formed with a plurality of rows with a plurality of points, the method comprising following steps:

(a) using a computing device to select seven initial check points from only three adjacent rows with six of the initial check points positioned at vertices of a flatted hexagon and one of the initial check points positioned at a center of the flatted hexagon in one image stored in a memory unit of the computing device;

(b) using the computing device to search for a minimum block distortion measure (BDM) point among the seven initial check points by computing and comparing for the BDM value of each check point; and (c) generating a motion vector by the computing device according to positions of the minimum block distortion measure point found in step (b) and the initial check point positioned at the center of the flatted hexagon;

wherein the flatted hexagon occupies eleven points of the image, with seven check points and four uncheck points.

2. The method of claim 1 further comprising following steps:

(d) using the computing device to select four new check points adjacent to the initial check point positioned at the center of the flatted hexagon when the initial check point positioned at the center of the flatted hexagon is the minimum block distortion measure point of the seven initial check points; and (e) using the computing device to search the four new check points selected in step (d) and the initial check point positioned at the center of the flatted hexagon for a minimum block distortion measure point of the four new check points selected in step (d) and the initial check point positioned at the center of the flatted hexagon.

3. The method of claim 1 further comprising following steps:

(d) using the computing device to select three new check points positioned symmetrical to three initial check points closest to the initial check point positioned at a first vertex of the flatted hexagon when the initial check point positioned at the first vertex of the flatted hexagon is the minimum block distortion measure point of the seven initial check points; and (e) using the computing device to search the three new check points selected in step (d) and the initial check point at the first vertex of the flatted hexagon for a minimum block distortion measure point of the three new check points selected in step (d) and the initial check point at the first vertex of the flatted hexagon.

4. The method of claim 3 wherein step (e) comprises searching the three new check points selected in step (d), the initial check point at the first vertex of the flatted hexagon, and the three initial check points closest to the initial check point positioned at the first vertex of the flatted hexagon for a minimum block distortion measure point of the three new check points selected in step (d), the initial check point at the first vertex of the flatted hexagon, and the three initial check points closest to the initial check point positioned at the first vertex of the flatted hexagon.

5. The method of claim 3 further comprising following steps:

(f) using the computing device to select four new check points adjacent to the initial check point positioned at the first vertex of the flatted hexagon when the initial check point positioned at the first vertex of the flatted hexagon is the minimum block distortion measure point of the three new check points selected in step (d) and the initial check point at the first vertex of the flatted hexagon; and (g) using the computing device to search the four new check points selected in step (f) and the initial check point positioned at the first vertex of the flatted hexagon for a minimum block distortion measure point of the four new check points selected in step (f) and the initial check point positioned at the first vertex of the flatted hexagon.

* * * * *